UNITED STATES PATENT OFFICE.

BAPTIST REUTER AND KARL STREITWOLF, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MIXTURES OF ALKALI SALTS OF $4.4^1$-DIOXY-$3.3^1$-DIAMINO-ARSENOBENZENE AND PROCESS OF MAKING SAME.

1,191,997.  Specification of Letters Patent.  Patented July 25, 1916.

No Drawing.  Application filed December 29, 1914. Serial No. 879,578.

*To all whom it may concern:*

Be it known that we, BAPTIST REUTER, Ph. D., chemist, and KARL STREITWOLF, Ph. D., apothecary, citizens of the Empire of Germany, residing at Höchst-on-the-Main, Germany, have invented certain new and useful Improvements in Mixtures of Alkali Salts of $4.4^1$-Dioxy-$3.3^1$-Diamino-Arsenobenzene and Processes of Making Same, of which the following is a specification.

We have found that solid stable preparations are obtained from alkali salts of $4.4^1$-dioxy-$3.3^1$-diamino-arsenobenzene by mixing these alkali salts, dissolved in water, with polyvalent alcohols, that is to say, with alcohols containing more than 3 hydroxyl groups, such, for instance, as erythrite and mannite, and precipitating the new preparations from the solution thus obtained by adding alcohol and ether. Most probably said preparations are not chemical compounds, but intimate mixtures of the alkali salts above referred to with the polyvalent alcohols. The new preparations are powders of a yellow color, readily soluble in water with an alkaline reaction and almost insoluble in alcohol and ether; on adding diluted hydrochloric acid to their solution there at first separates dioxydiaminoarsenobenzene which, on addition of a larger quantity of hydrochloric acid, is re-dissolved. Unlike the pure alkali salts of the dioxydiaminoarsenobenzene, the new preparations are stable if they are kept without access of air in glass-ampules. An important advantage arising from the use of polyvalent alcohols, including mannite, in connection with these preparations is that the products are decidedly less hygroscopic than those prepared for example with hyraldite, and are moreover more stable, especially under tropical conditions.

The procedure for making the new preparations may, for instance, be as follows:

47.5 grams of $4.4^1$-dioxy-$3.3^1$-diaminoarsenobenzene-dihydrochlorid are dissolved in 200 cc. of water and mixed with 40 cc. 10 N. caustic soda lye, whereupon 17.2 grams of mannite dissolved in 100 cc. of water are added. With the solution thus obtained are then mixed 4 liters of absolute alcohol and 4 liters of ether; a yellow powder separates which is filtered, washed with alcohol and ether and dried *in vacuo;* the product has the above mentioned properties.

Having now described our invention, what we claim is:

1. As new products, intimate mixtures of alkali-salts of $4.4^1$-dioxy-$3.3^1$-diaminoarsenobenzene with polyvalent alcohols, being yellow powders readily soluble in water with alkaline reaction, almost insoluble in alcohol and ether, its aqueous solution separating on addition of diluted hydrochloric acid dioxydiaminoarsenobenzene which is re-dissolved by adding an excess of the acid.

2. As new products, intimate mixtures of the di-sodium salt of $4.4^1$-dioxy-$3.3^1$-diaminoarsenobenzene with mannite, being yellow powders readily soluble in water with alkaline reaction, almost insoluble in alcohol and ether, its aqueous solution separating on addition of diluted hydrochloric acid dioxydiaminoarsenobenzene which is re-dissolved by adding an excess of the acid.

3. As a new process, the preparation of an intimate mixture of the alkali salts of the dioxydiaminoarsenobenzene with mannite, which process consists in mixing alcohol and ether with the aqueous solution containing said alkali salts and mannite.

In testimony whereof, we affix our signatures in presence of two witnesses.

BAPTIST REUTER.
KARL STREITWOLF.

Witnesses:
JEAN GRUND,
CARL GRUND.